(12) United States Patent
Kojima

(10) Patent No.: US 10,403,323 B1
(45) Date of Patent: Sep. 3, 2019

(54) MAGNETIC DISK DEVICE AND METHOD OF CONTROLLING THE SAME

(71) Applicants: Kabushiki Kaisha Toshiba, Minato-ku, Tokyo (JP); Toshiba Electronic Devices & Storage Corporation, Minato-ku, Tokyo (JP)

(72) Inventor: Shuichi Kojima, Ota Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/126,362

(22) Filed: Sep. 10, 2018

(30) Foreign Application Priority Data

Mar. 20, 2018 (JP) .................................. 2018-053035

(51) Int. Cl.
*G11B 20/12* (2006.01)
*G11B 20/10* (2006.01)
*G11B 5/09* (2006.01)

(52) U.S. Cl.
CPC .......... *G11B 20/10481* (2013.01); *G11B 5/09* (2013.01)

(58) Field of Classification Search
CPC ..... G11B 20/12; G11B 20/18; G11B 15/0005; G11B 15/52; G11B 15/463
USPC ................................ 360/48, 53, 72.1, 73.12
See application file for complete search history.

(56) References Cited

U.S. PATENT DOCUMENTS

| | | | |
|---|---|---|---|
| 4,357,635 A | 11/1982 | Hasegawa | |
| 4,799,112 A | 1/1989 | Bremmer et al. | |
| 4,894,734 A | 1/1990 | Fischler et al. | |
| 6,195,218 B1 | 2/2001 | Guttmann et al. | |
| 8,289,827 B2 * | 10/2012 | Nishimura | G11B 7/00456 369/47.51 |
| 9,105,279 B2 | 8/2015 | Shiroishi | |
| 9,330,701 B1 | 5/2016 | Michel et al. | |
| 9,424,864 B2 | 8/2016 | Neppalli et al. | |

FOREIGN PATENT DOCUMENTS

| | | |
|---|---|---|
| JP | 2005-56876 A | 3/2005 |
| JP | 6-290543 B2 | 3/2018 |

* cited by examiner

*Primary Examiner* — Nabil Z Hindi
(74) *Attorney, Agent, or Firm* — White & Case LLP

(57) ABSTRACT

According to one embodiment, a magnetic disk device includes a disk, a head, and a controller configured to control the head based on a plurality of upper parameter groups each corresponding to a plurality of upper areas among a plurality of parameter groups each corresponding to a plurality of recording areas into which the disk is divided in a radial direction, the upper areas each corresponding to the recording areas, and a plurality of lower parameter groups each corresponding to a plurality of lower areas into which the upper areas are each divided in the radial direction, the lower parameter groups being different from the upper parameter groups among the parameter groups.

20 Claims, 12 Drawing Sheets

| Layer X Zone number | Layer Y Zone number | Layer Z Zone number |
|---|---|---|
| ⋮ | ⋮ | ⋮ |
| X0 | X0Y0 | X0Y0Z0 |
| | | X0Y0Z1 |
| | X0Y1 | X0Y1Z0 |
| | | X0Y1Z1 |
| | X0Y2 | X0Y2Z0 |
| | | X0Y2Z1 |
| | X0Y3 | X0Y3Z0 |
| | | X0Y3Z1 |
| | X0Y4 | X0Y4Z0 |
| | | X0Y4Z1 |
| X1 | X1Y0 | X1Y0Z0 |
| | | X1Y0Z1 |
| | X1Y1 | X1Y1Z0 |
| | | X1Y1Z1 |
| | X1Y2 | X1Y2Z0 |
| | | X1Y2Z1 |
| | X1Y3 | X1Y3Z0 |
| | | X1Y3Z1 |
| | X1Y4 | X1Y4Z0 |
| | | X1Y4Z1 |
| ⋮ | ⋮ | ⋮ |
| Xn | XnY0 | XnY0Z0 |
| | | XnY0Z1 |
| | XnY1 | XnY1Z0 |
| | | XnY1Z1 |
| | XnY2 | XnY2Z0 |
| | | XnY2Z1 |
| | XnY3 | XnY3Z0 |
| | | XnY3Z1 |
| | XnY4 | XnY4Z0 |
| | | XnY4Z1 |

| Layer X | | | | Layer Y | | | | Layer Z | | | |
|---|---|---|---|---|---|---|---|---|---|---|---|
| Zone number | Parameter A | Parameter B | ... | Zone number | Parameter C | Parameter D | ... | Zone number | Parameter E | Parameter F | ... |
| X0 | A0 | B0 | ... | X0Y0 | C0 | D0 | ... | X0Y0Z0 | E0 | F0 | ... |
| | | | | X0Y1 | C1 | D1 | | X0Y0Z1 | E1 | F1 | |
| | | | | X0Y2 | C2 | D2 | | X0Y1Z0 | E2 | F2 | |
| | | | | X0Y3 | C3 | D3 | | X0Y1Z1 | E3 | F3 | |
| | | | | X0Y4 | C4 | D4 | | X0Y2Z0 | E4 | F4 | |
| | | | | | | | | X0Y2Z1 | E5 | F5 | |
| | | | | | | | | X0Y3Z0 | E6 | F6 | |
| | | | | | | | | X0Y3Z1 | E7 | F7 | |
| | | | | | | | | X0Y4Z0 | E8 | F8 | |
| | | | | | | | | X0Y4Z1 | E9 | F9 | |
| X1 | A1 | B1 | ... | X1Y0 | C5 | D5 | ... | X1Y0Z0 | E10 | F10 | ... |
| | | | | X1Y1 | C6 | D6 | | X1Y0Z1 | E11 | F11 | |
| | | | | X1Y2 | C7 | D7 | | X1Y1Z0 | E12 | F12 | |
| | | | | X1Y3 | C8 | D8 | | X1Y1Z1 | E13 | F13 | |
| | | | | X1Y4 | C9 | D9 | | X1Y2Z0 | E14 | F14 | |
| | | | | | | | | X1Y2Z1 | E15 | F15 | |
| | | | | | | | | X1Y3Z0 | E16 | F16 | |
| | | | | | | | | X1Y3Z1 | E17 | F17 | |
| | | | | | | | | X1Y4Z0 | E18 | F18 | |
| | | | | | | | | X1Y4Z1 | E19 | F19 | |
| ... | ... | ... | | ... | ... | ... | | ... | ... | ... | |
| Xn | An | Bn | ... | XnY0 | Ck-4 | Dk-4 | ... | XnY0Z0 | Em-9 | Fm-9 | ... |
| | | | | XnY1 | Ck-3 | Dk-3 | | XnY0Z1 | Em-8 | Fm-8 | |
| | | | | XnY2 | Ck-2 | Dk-2 | | XnY1Z0 | Em-7 | Fm-7 | |
| | | | | XnY3 | Ck-1 | Dk-1 | | XnY1Z1 | Em-6 | Fm-6 | |
| | | | | XnY4 | Ck | Dk | | XnY2Z0 | Em-5 | Fm-5 | |
| | | | | | | | | XnY2Z1 | Em-4 | Fm-4 | |
| | | | | | | | | XnY3Z0 | Em-3 | Fm-3 | |
| | | | | | | | | XnY3Z1 | Em-2 | Fm-2 | |
| | | | | | | | | XnY4Z0 | Em-1 | Fm-1 | |
| | | | | | | | | XnY4Z1 | Em | Fm | |

| TB2 | Layer X | | | Layer Y | | | | Layer Z | | |
|---|---|---|---|---|---|---|---|---|---|---|
| | Zone number | Parameter A | Parameter B | Zone number | Parameter C | Parameter D | | Zone number | Parameter E | Parameter F |
| | ... | ... | ... | ... | ... | ... | | ... | ... | ... |
| | X0 | A0 | B0 | X0Y0 | C0 | D0 | | X0Y0Z0 | E0 | F0 |
| | | | | | | | | X0Y0Z1 | E1 | F1 |
| | | | | X0Y1 | C1 | D1 | | X0Y1Z0 | E2 | F2 |
| | | | | | | | | X0Y1Z1 | E3 | F3 |
| | | | | X0Y2 | C2 | D2 | | X0Y2Z0 | E4 | F4 |
| | | | | | | | | X0Y2Z1 | E5 | F5 |
| | | | | X0Y3 | C3 | D3 | | X0Y3Z0 | E6 | F6 |
| | | | | | | | | X0Y3Z1 | E7 | F7 |
| | | | | X0Y4 | C4 | D4 | | X0Y4Z0 | E8 | F8 |
| | | | | | | | | X0Y4Z1 | E9 | F9 |
| | X1 | A1 | B1 | X1Y0 | C5 | D5 | | X1Y0Z0 | E10 | F10 |
| | | | | | | | | X1Y0Z1 | E11 | F11 |
| | | | | X1Y1 | C6 | D6 | | X1Y1Z0 | E12 | F12 |
| | | | | | | | | X1Y1Z1 | E13 | F13 |
| | | | | X1Y2 | C7 | D7 | | X1Y2Z0 | E14 | F14 |
| | | | | | | | | X1Y2Z1 | E15 | F15 |
| | | | | X1Y3 | C8 | D8 | | X1Y3Z0 | E16 | F16 |
| | | | | | | | | X1Y3Z1 | E17 | F17 |
| | | | | X1Y4 | C9 | D9 | | X1Y4Z0 | E18 | F18 |
| | | | | | | | | X1Y4Z1 | E19 | F19 |
| | ... | ... | ... | ... | ... | ... | | ... | ... | ... |
| | Xn | An | Bn | XnY0 | Ck-4 | Dk-4 | | XnY0Z0 | Em-9 | Fm-9 |
| | | | | | | | | XnY0Z1 | Em-8 | Fm-8 |
| | | | | XnY1 | Ck-3 | Dk-3 | | XnY1Z0 | Em-7 | Fm-7 |
| | | | | | | | | XnY1Z1 | Em-6 | Fm-6 |
| | | | | XnY2 | Ck-2 | Dk-2 | | XnY2Z0 | Em-5 | Fm-5 |
| | | | | | | | | XnY2Z1 | Em-4 | Fm-4 |
| | | | | XnY3 | Ck-1 | Dk-1 | | XnY3Z0 | Em-3 | Fm-3 |
| | | | | | | | | XnY3Z1 | Em-2 | Fm-2 |
| | | | | XnY4 | Ck | Dk | | XnY4Z0 | Em-1 | Fm-1 |
| | | | | | | | | XnY4Z1 | Em | Fm |

| TB2 | Layer X | | Layer Y | | | Layer Z | | |
|---|---|---|---|---|---|---|---|---|
| | Zone number | Parameter A | Parameter B | Zone number | Parameter C | Parameter D | Zone number | Parameter E | Parameter F |
| | ... | ... | ... | ... | ... | ... | ... | ... | ... |
| | X0 | A0 | B0 | X0Y0 | C0 | D0 | X0Y0Z0 | E0 | F0 |
| | | | | | | | X0Y0Z1 | E1 | F1 |
| | | | | X0Y1 | C1 | D1 | X0Y1Z0 | E2 | F2 |
| | | | | | | | X0Y1Z1 | E3 | F3 |
| | | | | X0Y2 | C2 | D2 | X0Y2Z0 | E4 | F4 |
| | | | | | | | X0Y2Z1 | E5 | F5 |
| | | | | X0Y3 | C3 | D3 | X0Y3Z0 | E6 | F6 |
| | | | | | | | X0Y3Z1 | E7 | F7 |
| | | | | X0Y4 | C4 | D4 | X0Y4Z0 | E8 | F8 |
| | | | | | | | X0Y4Z1 | E9 | F9 |
| | X1 | A1 | B1 | X1Y0 | C5 | D5 | X1Y0Z0 | E10 | F10 |
| | | | | | | | X1Y0Z1 | E11 | F11 |
| | | | | X1Y1 | C6 | D6 | X1Y1Z0 | E12 | F12 |
| | | | | | | | X1Y1Z1 | E13 | F13 |
| | | | | X1Y2 | C7 | D7 | X1Y2Z0 | E14 | F14 |
| | | | | | | | X1Y2Z1 | E15 | F15 |
| | | | | X1Y3 | C8 | D8 | X1Y3Z0 | E16 | F16 |
| | | | | | | | X1Y3Z1 | E17 | F17 |
| | | | | X1Y4 | C9 | D9 | X1Y4Z0 | E18 | F18 |
| | | | | | | | X1Y4Z1 | E19 | F19 |
| | ... | ... | ... | ... | ... | ... | ... | ... | ... |
| | Xn | An | Bn | XnY0 | Ck-4 | Dk-4 | XnY0Z0 | Em-9 | Fm-9 |
| | | | | | | | XnY0Z1 | Em-8 | Fm-8 |
| | | | | XnY1 | Ck-3 | Dk-3 | XnY1Z0 | Em-7 | Fm-7 |
| | | | | | | | XnY1Z1 | Em-6 | Fm-6 |
| | | | | XnY2 | Ck-2 | Dk-2 | XnY2Z0 | Em-5 | Fm-5 |
| | | | | | | | XnY2Z1 | Em-4 | Fm-4 |
| | | | | XnY3 | Ck-1 | Dk-1 | XnY3Z0 | Em-3 | Fm-3 |
| | | | | | | | XnY3Z1 | Em-2 | Fm-2 |
| | | | | XnY4 | Ck | Dk | XnY4Z0 | Em-1 | Fm-1 |
| | | | | | | | XnY4Z1 | Em | Fm |

F I G. 10

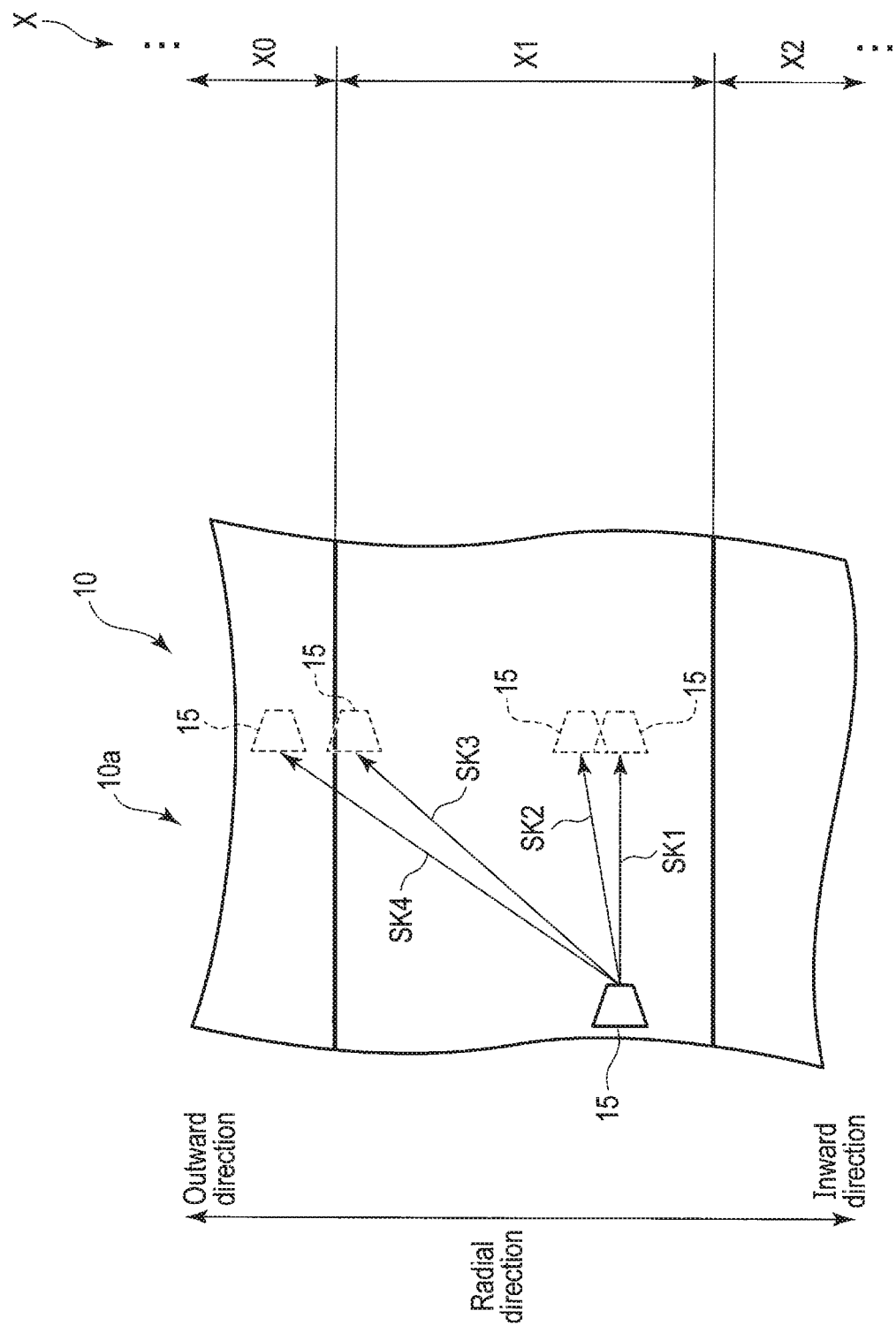
F I G. 11

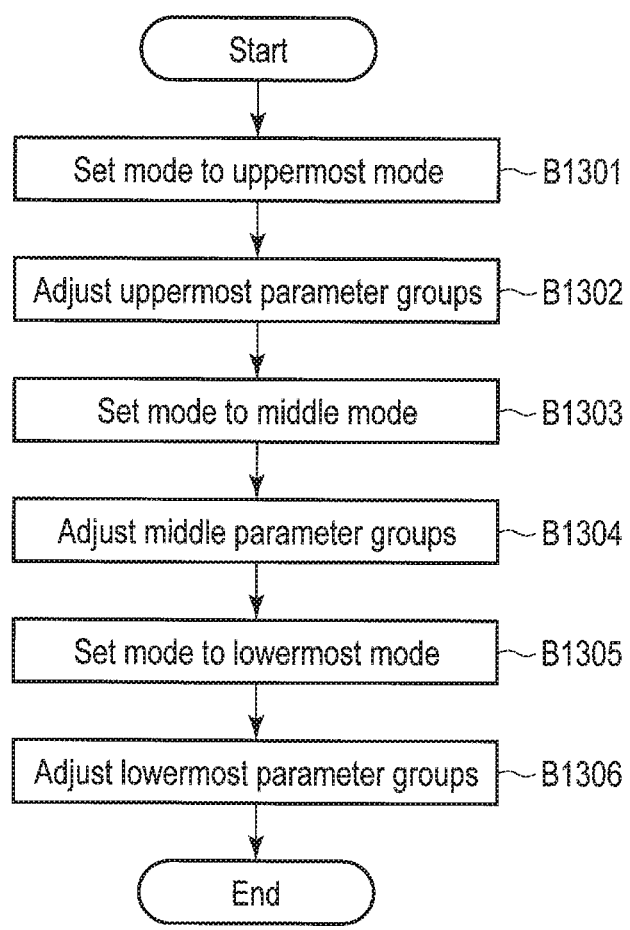
F I G. 13

US 10,403,323 B1

MAGNETIC DISK DEVICE AND METHOD OF CONTROLLING THE SAME

CROSS-REFERENCE TO RELATED APPLICATIONS

This application is based upon and claims the benefit of priority from Japanese Patent Application No. 2018-053035, filed Mar. 20, 2018, the entire contents of which are incorporated herein by reference.

FIELD

Embodiments described herein relate generally to a magnetic disk device and a method of controlling the same.

BACKGROUND

In a magnetic disk device, a recording area of a disk is divided into a plurality of zones in a radial direction. In order to efficiently write data to the disk, it is necessary to further subdivide the zones, but capacities of a plurality of parameters corresponding to each head set in each zone can be increased. Due to the sub-division of the zones, in the magnetic disk device, performance related to setting of an amount of used memory or read processing and write processing can be deteriorated.

BRIEF DESCRIPTION OF THE DRAWINGS

FIG. 4 is a schematic view showing an example of a table of a hierarchical structure of a particular zone according to the embodiment;

FIG. 5 is a schematic view showing an example of a table showing a relationship between each layer and each parameter group according to the embodiment;

FIG. 8 is a schematic view showing an example of a table showing a relationship between each parameter group changeable when a mode is set to the middle mode and a plurality of radial ranges corresponding to each layer according to the embodiment;

FIG. 10 is a schematic view showing an example of a table showing a relationship between each parameter group changeable when a mode is set to the uppermost mode and each layer according to the embodiment;

FIG. 11 is a schematic view showing an example of a method of changing each parameter of each layer depending on a radial position of the head when a mode is set to the uppermost mode according to the embodiment;

FIG. 13 is a flowchart showing an example of a method of adjusting each parameter of each layer according to the embodiment.

DETAILED DESCRIPTION

In general, according to one embodiment, a magnetic disk device comprises: a disk; a head configured to write data to the disk and read data from the disk; and a controller configured to control the head based on a plurality of upper parameter groups each corresponding to a plurality of upper areas among a plurality of parameter groups each corresponding to a plurality of recording areas into which the disk is divided in a radial direction, the upper areas each corresponding to the recording areas, and a plurality of lower parameter groups each corresponding to a plurality of lower areas into which the upper areas are each divided in the radial direction, the lower parameter groups being different from the upper parameter groups among the parameter groups.

According to another embodiment, a method of controlling a magnetic disk device comprising a disk and a head configured to write data to the disk and read data from the disk, the method comprising: controlling the head based on a plurality of upper parameter groups each corresponding to a plurality of upper areas among a plurality of parameter groups each corresponding to a plurality of recording areas into which the disk is divided in a radial direction, the upper areas each corresponding to the recording areas, and a plurality of lower parameter groups each corresponding to a plurality of lower areas into which the upper areas are each divided in the radial direction, the lower parameter groups being different from the upper parameter groups among the parameter groups.

Hereinafter, embodiments will be described with reference to the drawings. It should be noted that the drawings are an example, and do not limit the scope of the invention.

Embodiment

Figure 1:
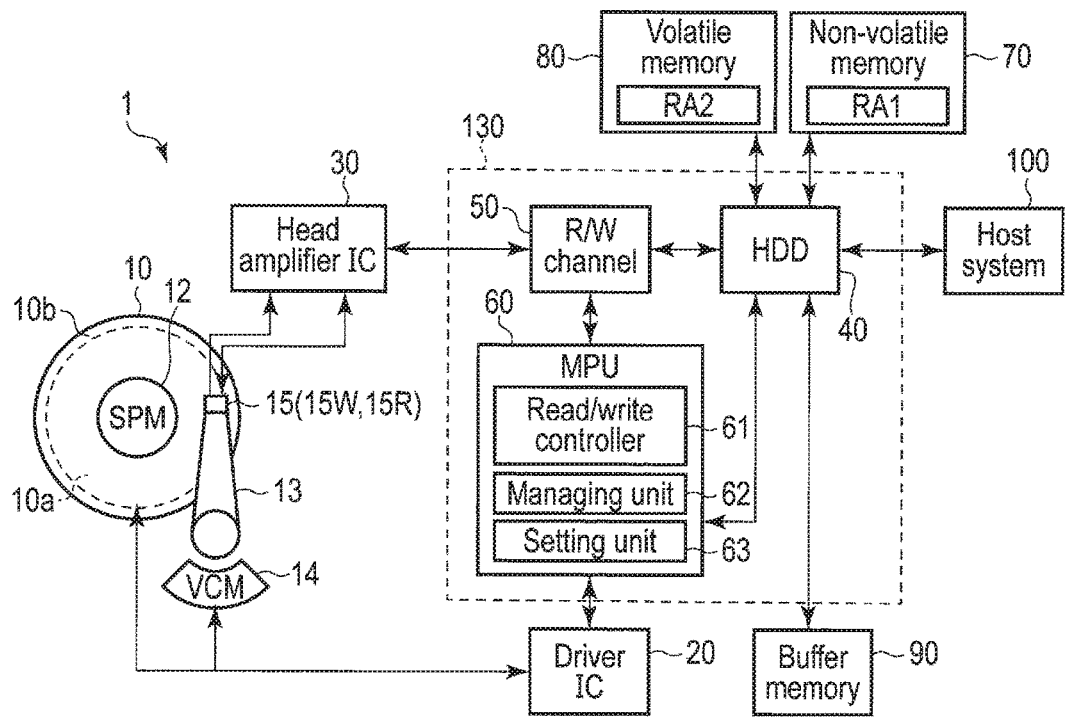
FIG. 1 is a block diagram showing a configuration of a magnetic disk device according to an embodiment.

FIG. 1 is a block diagram showing a configuration of a magnetic disk device 1 according to an embodiment.

The magnetic disk device 1 includes a head disk assembly (HDA), a driver integrated circuit (IC) 20, a head amplifier integrated circuit (hereinafter, referred to as a head amplifier IC or a preamplifier) 30, a non-volatile memory 70, a volatile memory 80, a buffer memory (a buffer) 90, and a system controller 130, which is a single chip integrated circuit, to be described below. In addition, the magnetic disk device 1 is connected to a host system (a host) 100.

The HDA has a magnetic disk (hereinafter, referred to as a disk) 10, a spindle motor (SPM) 12, an arm 13 mounted with a head 15, and a voice coil motor (VCM) 14. The disk 10 is attached to the spindle motor 12, and rotates by driving of the spindle motor 12. The arm 13 and the VCM 14 constitute an actuator. The actuator controls movement of the head 15 mounted at the arm 13 to a particular position in a radial direction (hereinafter, simply referred to as a radial position) on the disk 10 by driving of the VCM 14. The numbers of disks 10 and heads 15 may be two or more.

A user data region 10a available by a user and a system area 10b to which information required for managing a system is written are allocated to a recording area of the disk 10. Hereinafter, a direction orthogonal to the radial direction of the disk 10 is referred to as a circumferential direction. In the radial direction, a direction toward an outer circumference of the disk 10 is referred to as an outward direction (outward), and an opposite direction to the outward direction is referred to as an inward direction (inward). In addition, a term "access" is used to mean both of "writing data to the disk 10" and "reading data from the disk 10". The disk 10 (the user data region 10a) is divided into a plurality of zones in each range in the radial direction. The zone is a recording area including a plurality of tracks (cylinders).

The head 15 has a slider as a main body, and has a write head 15W and a read head 15R mounted on the slider. The write head 15W writes the data to the disk 10. The read head 15R reads the data recoded to data tracks on the disk 10.

Figure 2:
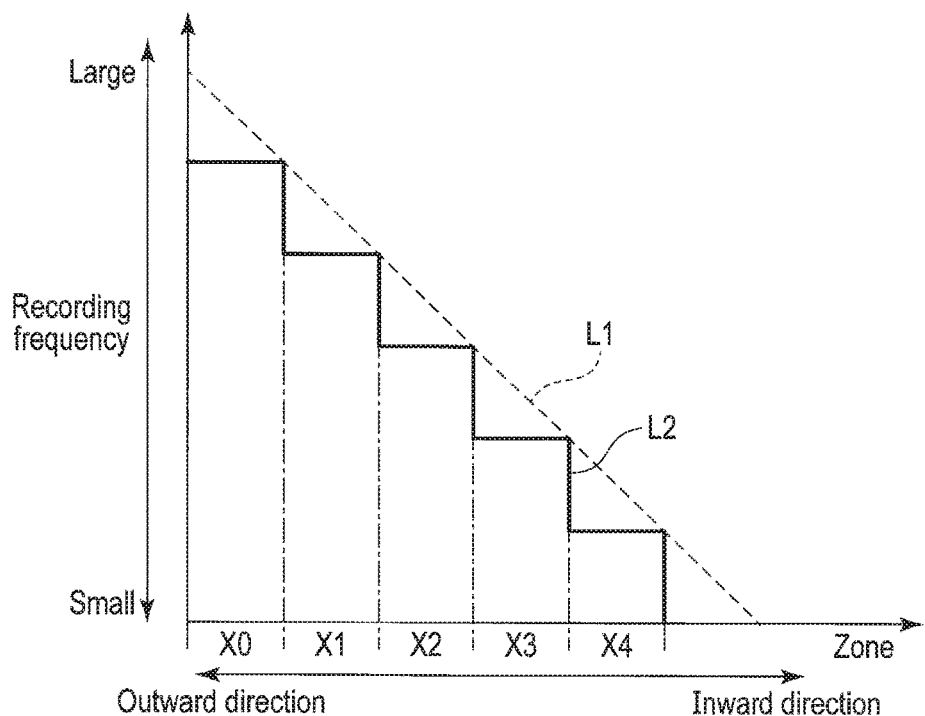
FIG. 2 is a view showing an example of a relationship between a radial position of a disk and a recording frequency to the disk by a head according to the embodiment.

FIG. 2 is a view showing an example of a relationship between a radial position of the disk 10 and a recording frequency to the disk 10 by the head 15 according to the embodiment. In FIG. 2, a horizontal axis indicates a zone, and a vertical axis indicates a recording frequency. In FIG. 2, zones X0, X1, X2, X3, and X4 continuously arranged from an outward direction of the radial direction to an inward direction of the radial direction are shown. In addition, in FIG. 2, a change L1 in a recording frequency (hereinafter, simply referred to as a recording frequency) to the disk 10 by the head 15 with respect to an actual radial position and a change L2 in a recording frequency with respect to a radial position when a recording frequency is set to be constant in each zone are shown. Hereinafter, the "change L1 in the recording frequency with respect to the actual radial position" is referred to as a "change L1 in an actual recording frequency". In addition, the "change L2 in the recording frequency with respect to the radial position when the recording frequency is set to be constant in each zone" is referred to as a "change L2 in the set recording frequency".

Since the disk 10 is rotating at a constant rotational speed by the SPM 12, recording frequencies are different from each other between the outward and inward directions of the disk 10. As in the example shown in FIG. 2, the change L1 in the actual recording frequency becomes large from the inward direction toward the outward direction. That is, a recording area of an outer side of the disk 10 has a recordable capacity (hereinafter, simply referred to as a recording capacity) larger than that of a recording area of an inner side of the disk 10. In addition, in the magnetic disk device 1, the recording frequency is set to be constant in each zone, as shown by the change L2 in the set recording frequency. Step portions of the change L2 in the set recording frequency are smaller than the change L1 in the actual recording frequency. That is, a recording capacity of each zone written depending on the change L2 in the set recording frequency can be smaller than that of each zone written depending on the change L1 in the actual recording frequency. For this reason, it is possible to efficiently write the data to the disk 10 by approximating the change L2 in the set recording frequency to the change L1 in the actual recording frequency. In other words, it is possible to efficiently write the data to the disk 10 by further subdividing each zone.

The driver IC 20 controls the driving of the SPM 12 and the VCM 14 according to a control of the system controller 130 (more specifically, a micro processing unit (MPU) 60 to be described below).

The head amplifier IC (the preamplifier) 30 has a read amplifier and a write driver. The read amplifier amplifies a read signal read from the disk 10, and outputs the amplified read signal to the system controller 130 (more specifically, a read/write (R/W) channel 50 to be described below). The write driver outputs a write current corresponding to write data output from the R/W channel 50 to the head 15.

The non-volatile memory 70 is a semiconductor memory that records saved data even though power supplied is interrupted. The non-volatile memory 70 is, for example, a NOR-type or NAND-type flash read-only memory (FROM). The non-volatile memory 70 has, for example, a save area RA1. The save area RA1 may also be provided in another memory, for example, a volatile memory 80 or a buffer memory 90 to be described below, a system area 10b, or the like.

The volatile memory 80 is a semiconductor memory in which saved data are lost when power supply is interrupted. The volatile memory 80 stores data, and the like, necessary for processing in the respective units of the magnetic disk device 1. The volatile memory 80 is, for example, a dynamic random access memory (DRAM) or a synchronous dynamic random access memory SDRAM). The volatile memory 80 has, for example, a save area RA2. The save area RA2 may also be provided in another memory, for example, the non-volatile memory 70, a buffer memory 90 to be described below, or the like.

The buffer memory 90 is a semiconductor memory that temporarily records data, and the like, transmitted and received between the magnetic disk device 1 and the host 100. The buffer memory 90 may also be configured integrally with the volatile memory 80. The buffer memory 90 is, for example, a DRAM, a static random access memory (SRAM), a SDRAM, a ferroelectric random access memory (FeRAM), a magnetoresistive random access memory (MRAM), or the like.

The system controller (a controller) 130 is realized using, for example, a large scale integration (LSI) called a system-on-a-chip (SoC) in which a plurality of elements are integrated in a single chip. The system controller 130 includes a hard disk controller (HDC) 40, the read/write (R/W) channel 50, and the micro processing unit (MPU) 60. The HDC 40, the R/W channel 50, and the MPU 60 are electrically connected to each other, respectively. The system controller 130 is electrically connected to, for example, the driver IC 20, the head amplifier IC 30, the non-volatile memory 70, the volatile memory 80, the buffer memory 90, the host system 100, and the like.

The HDC 40 controls data transmission between the host 100 and the R/W channel 50 depending on an instruction from the MPU 60 to be described below. The HDC 40 is electrically connected to, for example, the non-volatile memory 70, the volatile memory 80, the buffer memory 90, and the like.

The R/W channel 50 performs signal processing on read data and write data depending on an instruction from the MPU 60. The R/W channel 50 has a circuit or function for measuring signal quality of the read data. The R/W channel 50 is electrically connected to, for example, the head amplifier IC 30, and the like.

The MPU 60 is a main controller that controls the respective units of the magnetic disk device 1. The MPU 60 controls the VCM 14 through the driver IC 20 to perform a servo control for executing positioning of the head 15. The MPU 60 controls an operation of writing the data to the disk 10, and selects a save destination of write data transmitted from the host 100. In addition, the MPU 60 controls an operation of reading the data from the disk 10, and controls processing on the read data transmitted from the disk 10 to the host 100. The MPU 60 is connected to the respective units of the magnetic disk device 1. The MPU 60 is electrically connected to, for example, the driver IC 20, the HDC 40, the R/W channel 50, and the like.

The MPU 60 includes a read/write controller 61, a managing unit 62, and a setting unit 63. The MPU 60 performs processing of these units, for example, the read/write controller 61, the managing unit 62, and the setting unit 63 on firmware. The MPU 60 may also include these units as circuits.

The read/write controller 61 controls read processing and write processing of the data depending on a command from the host 100. The read/write controller 61 controls the VCM 14 through the driver IC 20 to position the head 15 at a particular radial position on the disk 10 and read the data from the disk 10 or write the data to the disk 10.

The managing unit 62 manages a plurality of parameters related to read/write processing of the head 15 corresponding to each zone in a plurality of layers. In other words, the managing unit 62 defines each zone in several layers, defines each layer of each zone in several different ranges in a radial direction (hereinafter, referred to as radial ranges or radial areas), divides a plurality of parameters related to read/write processing corresponding to each zone per several parameters (hereinafter, referred to as a parameter group), and manages the plurality of parameters in different radial ranges per in each zone. That is, the managing unit 62 manages each parameter group in each layer corresponding to each radial range in each zone. The plurality of parameters include parameters indicating divisions of zones, recording frequencies, or the like. The plurality of parameters may include parameters related to signals or currents of the head 15, the head amplifier IC 30, the R/W channel 50, and the like, corresponding to radial positions, for example, currents corresponding to a write heater, a read heater, and a dynamic flying height (DFH), in the divisions of the zones, the recording frequencies, or the like. In addition, the plurality of parameters may include parameters referred to at the time of setting numerical values in a register of the head amplifier IC 30, or the like. Hereinafter, the largest radial range in each zone is referred to as the uppermost zone, the smallest radial range in each zone is referred to as the lowermost zone, and a radial range between the uppermost zone and the lowermost zone is referred to as the middle zone. The uppermost zone corresponds to each zone. The middle zones are several radial ranges divided from the uppermost zone, and the lowermost zones are several radial ranges divided from the middle zone. The number of middle zones may be plural. A layer corresponding to the uppermost zone is referred to as the uppermost layer, a layer corresponding to the middle zone is referred to as the middle layer, and a layer corresponding to the lowermost zone is referred to as the lowermost layer. The number of middle layers may be plural. The managing unit 62 records a plurality of radial ranges each corresponding to a plurality of layers defined in each zone and a relationship between the plurality of layers and a plurality of parameter groups in the save area RA1 as, for example, a table.

For example, the managing unit 62 defines the uppermost layer, the middle layer, and the lowermost layer in each zone, defines the uppermost layer in the uppermost zone, defines the middle layer in the middle zone, defines the lowermost layer in the lowermost zone, manages parameter groups (hereinafter, referred to as the uppermost parameter groups) of a plurality of parameters per uppermost zone, manages parameter groups (hereinafter, referred to as middle parameter groups) other than the uppermost parameter groups of the plurality of parameters per middle zone, and manages parameter groups (hereinafter, referred to as the lowermost parameter groups) other than the uppermost parameter groups and the middle parameter groups of the plurality of parameters per lowermost zone. The managing unit 62 records a plurality of uppermost zones corresponding to the uppermost layer defined in each zone, a plurality of middle zones corresponding to the middle layer defined in each zone, a plurality of lowermost zones corresponding to the lowermost layer defined in each zone, and a relationship among the uppermost zones, the middle zones, the lowermost zone, the uppermost parameter groups, the middle parameter groups, and the lowermost parameter groups in the save area RA1 as a table.

Figure 3:
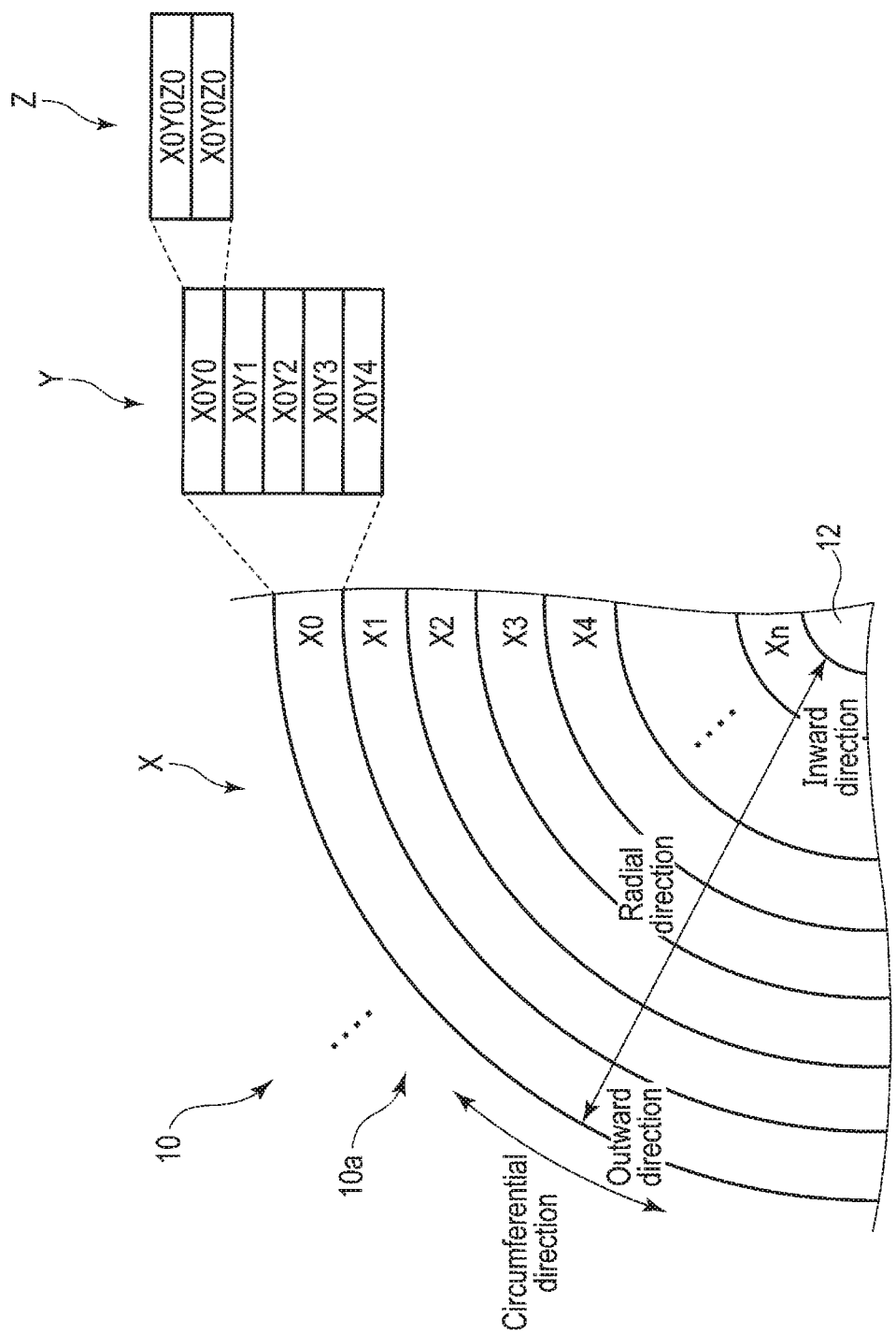
FIG. 3 is a schematic view showing an example of a hierarchical structure of a particular zone according to the embodiment.

FIG. 3 is a schematic view showing an example of a hierarchical structure of a particular zone according to the embodiment. In FIG. 3, the uppermost layer X, the middle layer Y, and the lowermost layer Z are shown. The uppermost layer X includes the uppermost zones X0, X1, X2, X3, X4, . . . , Xn continuously disposed from the outward direction to the inward direction.

In the example shown in FIG. 3, the managing unit 62 defines the uppermost layer X corresponding to each zone as the uppermost zone X, defines the middle layer Y corresponding to each zone as the middle zone Y, and the lowermost layer Z corresponding to each zone as the lowermost zone Z. Hereinafter, a concept including the meaning of the uppermost layer X may be simply referred to as the uppermost zone X, a concept including the meaning of the middle layer Y may be simply referred to as the middle zone Y, and a concept including the meaning of the lowermost layer Z may be simply referred to as the lowermost zone Z. In addition, the managing unit 62 divides the uppermost zone X corresponding to each zone into the middle zones Y, and divides the middle zone corresponding to each zone into the lowermost zones Z. In one example, the managing unit 62 divides the uppermost zone X0 corresponding to a particular zone into middle zones X0Y0, X0Y1, X0Y2, X0Y3, and X0Y4, and divides the middle zone X0Y0 into the lowermost zones X0Y0Z0 and X0Y0Z1. Similar to the middle zone X0Y0, the managing unit 62 divides the middle zones X0Y2 to X0Y4 into the two lowermost zones. In addition, similar to the uppermost zone X0, the managing unit 62 divides each of the uppermost zones X1 to X4 into five middle zones, and divides each of the five middle zones each corresponding to the uppermost zones X1 to X4 into the two lowermost zones.

FIG. 4 is a schematic view showing an example of a table TB1 of a hierarchical structure of a particular zone according to the embodiment.

The managing unit 62 records, for example, the table TB1 in the save area RA1. In the example shown in FIG. 4, the managing unit 62 divides the uppermost zone X0 into the middle zones X0Y0, X0Y1, X0Y2, X0Y3, and X0Y4, and divides the uppermost zone X1 into the middle zones X1Y0, X1Y1, X1Y2, X1Y3, and X1Y4, and divides the uppermost zone Xn into middle zones XnY0, XnY1, XnY2, XnY3, and XnY4, in the table TB1. The managing unit 62 divides the middle zone X0Y0 into the lowermost zones X0Y0Z0 and X0Y0Z1, divides the middle zone X0Y1 into the lowermost zones X0Y1Z0 and X0Y1Z1, divides the middle zone X0Y2 into the lowermost zones X0Y2Z0 and X0Y2Z1, divides the middle zone X0Y3 into the lowermost zones X0Y3Z0 and X0Y3Z1, and divides the middle zone X0Y4 into the lowermost zones X0Y4Z0 and X0Y4Z1, in the table TB1. Similarly to the middle zones X0Y0 to X0Y4, the managing unit 62 divides the middle zones X1Y0 to X1Y4 into the lowermost zones X1Y0Z0, X1Y0Z1, X1Y1Z0, X1Y1Z1, X1Y2Z0, X1Y2Z1, X1Y3Z0, X1Y3Z1, X1Y4Z0, and X1Y4Z1, respectively, the table TB1. In addition, similarly to the middle zones X0Y0 to X0Y4, the managing unit 62 divides the middle zones XnY0 to XnY4 into the lowermost zones XnY0Z0, XnY0Z1, XnY1Z0, XnY1Z1, XnY2Z0, XnY2Z1, XnY3Z0, XnY3Z1, XnY4Z0, and XnY4Z1, respectively, the table TB1.

FIG. 5 is a schematic view showing an example of a table TB2 showing a relationship between each layer and each parameter group according to the embodiment. In FIG. 5, parameters A, B, C, D, E, and F corresponding to each zone are shown. The parameters A to F are parameters related to different read/write processing, respectively. In FIG. 5, the uppermost parameter group includes the parameters A and B. The middle parameter group includes the parameters C and D. The lowermost parameter group includes the parameters E and F. Hereinafter, the parameters included in the uppermost parameter group are referred to as the uppermost parameters, the parameters included in the middle parameter group are referred to as the middle parameters, and the parameters included in the lowermost parameter group are referred to as the lowermost parameters. The uppermost parameter group, the middle parameter group, and the lowermost parameter group may include only one parameter or three or more parameters, respectively. In FIG. 5, the parameter A includes parameters A0, A1, . . . , An. The parameter B includes parameters B0, B1, . . . , Bn. The parameter C includes parameters C0, C1, C2, C3, C4, C5, C6, C7, C8, C9, . . . , Ck−4, Ck−3, Ck−2, Ck−1, and Ck. The parameter D includes parameters D0, D1, D2, D3, D4, D5, D6, D7, D8, D9, . . . , Dk−4, Dk−3, Dk−2, Dk−1, and Dk. The parameter E includes parameters E0, E1, E2, E3, E4, E5, E6, E7, E8, E9, E10, E11, E12, E13, E14, E15, E16, E17, E18, E19, . . . , Em−9, Em−8, Em−7, Em−6, Em−5, Em−4, Em−3, Em−2, Em−1, and Em. The parameter F includes parameters F0, F1, F2, F3, F4, F5, F6, F7, F8, F9, F10, F11, F12, F13, F14, F15, F16, F17, F18, F19, . . . , Fm−9, Fm−8, Fm−7, Fm−6, Fm−5, Fm−4, Fm−3, Fm−2, Fm−1, and Fm.

The managing unit 62 records, for example, the table TB2 in the save area RA1. In the example shown in FIG. 5, the managing unit 62 manages the parameters A and B per uppermost zone in the uppermost layer X, manages the parameters C and D per middle zone in the middle layer Y, and manages the parameters E and F per lowermost zone in the lowermost layer Z, in the table TB2. In one example, the managing unit 62 manages the parameters A0 and B0 in the uppermost zone X0, manages the parameters C0 to C4 and the parameters D0 to D4, respectively, in the middle zones X0Y0 to X0Y4, and manages the parameters E0 to E9 and the parameters F0 to F9, respectively, in the lowermost zones X0Y0Z0 to X0Y4Z1, in the table TB2. The managing unit 62 manages the parameters A1 and B1 in the uppermost zone X1, manages the parameters C5 to C9 and the parameters D5 to D9, respectively, in the middle zones X1Y0 to X1Y4, and manages the parameters E10 to E19 and the parameters F10 to F19, respectively, in the lowermost zones X1Y0Z0 to X1Y4Z1, in the table TB2. The managing unit 62 manages the parameters An and Bn in the uppermost zone Xn, manages the parameters Ck−4 to Ck and the parameters Dk−4 to Dk, respectively, in the middle zones XnY0 to XnY4, and manages the parameters Em−9 to Em and the parameters Fm−9 to Fm, respectively, in the lowermost zones XnY0Z0 to XnY4Z1, in the table TB2.

In addition, the managing unit 62 changes the parameter group per layer depending on a radial position of the head 15. For example, when the magnetic disk device 1 starts, the managing unit 62 reads each parameter group of each layer from the tables TB1 and TB2 recorded in the save area RA1, stores (or deploys or duplicates) each read parameter group of each layer in (or to) a particular storage area of the save area RA2, and stores (or deploys or duplicates) a part of each parameter group of each layer from the particular storage area of the save area RA2 in (or to) a storage area (hereinafter, also referred to as a deployment area) of the save area RA2 accessible (for example, accessible at a high speed) from the system controller 130, or the like, and different from the particular storage area depending on the radial position of the head 15. Parameters, and the like, referred to at the time of setting numerical values in the R/W channel 50, the register of the head amplifier IC 30, or the like, through the system controller 130, for example, the HDC 40 or the MPU 60 are stored in the deployment area. The managing unit 62 may change parameters of all the layers when the head 15 is changed into another head 15.

Figure 6:
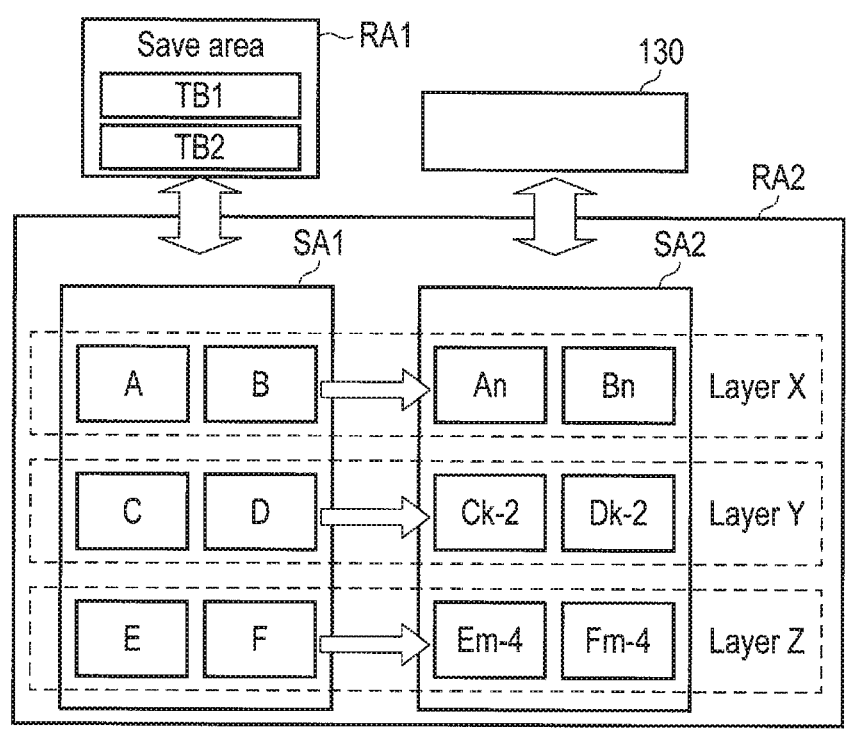
FIG. 6 is a block diagram showing an example of a method of storing each parameter of each layer according to the embodiment.

FIG. 6 is a block diagram showing an example of a method of storing each parameter of each layer according to the embodiment. In FIG. 6, a save area RA1 includes tables TB1 and TB2. A save area RA2 includes a storage area SA1 and a deployment area SA2.

In the example shown in FIG. 6, when the magnetic disk device 1 starts, the managing unit 62 reads the uppermost parameters A and B corresponding to the uppermost layer X, the middle parameters C and D corresponding to the middle layer Y, and the lowermost parameters E and F corresponding to the lowermost layer Z from the tables TB1 and TB2 of the save area RA1, and stores each of the parameters A, B, C, D, E, and F in the storage area SA1. The managing unit 62 deploys the uppermost parameters An and Bn from the uppermost parameters A and B stored in the storage area SA1 to the deployment area SA2 in the uppermost layer X, deploys the middle parameters Ck−2 and Dk−2 from the middle parameters C and D stored in the storage area SA1 to the deployment area SA2 in the middle layer Y, and deploys the lowermost parameters Em−4 and Fm−4 from the lowermost parameters E and F stored in the storage area SA1 to the deployment area SA2 in the lowermost layer Z, depending on the radial position of the head 15.

Figure 7:
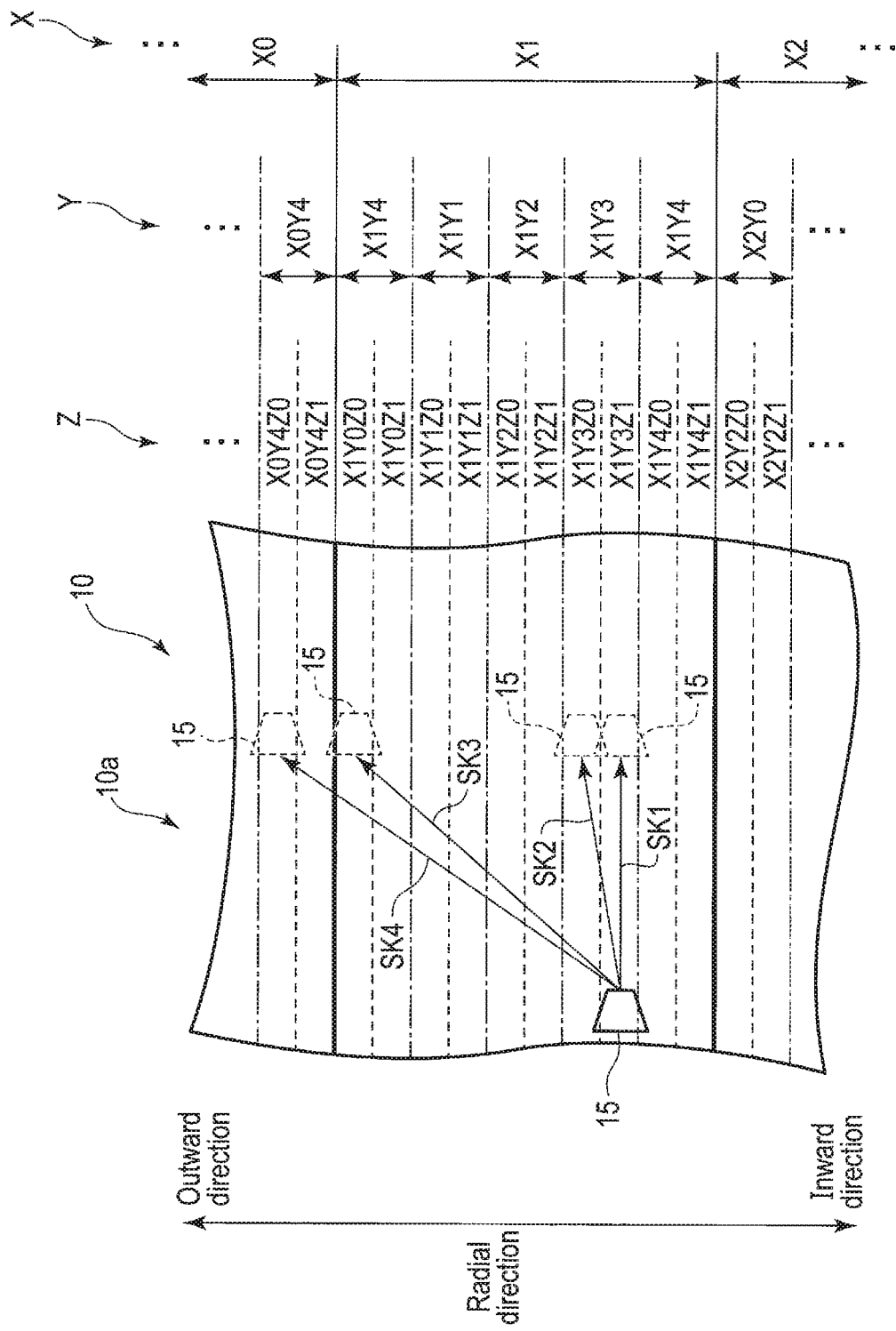
FIG. 7 is a schematic view showing an example of a method of changing each parameter of each layer depending on a radial position of the head according to the embodiment.

FIG. 7 is a schematic view showing an example of a method of changing each parameter of each layer depending on a radial position of the head 15 according to the embodiment. In FIG. 7, a correspondence relationship between recording areas of particular zones of the disk 10 and the uppermost zone X, the middle zone Y, and the lowermost zone Z is shown. For convenience of explanation, the recording areas of the particular zones of the disk 10 each corresponding to the uppermost zone X, the middle zone Y, and the lowermost zone Z may be simply referred to as the uppermost zone X, the middle zone Y, and the lowermost zone Z, respectively. In FIG. 7, seek 1, seek 2, seek 3, and seek 4 indicate movements from a particular radial position on the disk 10 to a particular radial position, respectively.

In the example shown in FIG. 7, when the head 15 is tracking the lowermost zone X1Y3Z1 as indicated by the seek SK1, the head 15 does not move from the lowermost zone X1Y3Z1, and the managing unit 62 does not thus change the uppermost parameters A1 and B1 deployed in the deployment area SA2 and corresponding to the uppermost zone X1, the middle parameters C8 and D8 deployed in the deployment area SA2 and corresponding to the middle zone X1Y3, and the lowermost parameters E17 and F17 deployed in the deployment area SA2 and corresponding to the lowermost zone X1Y3Z1 based on, for example, the table TB2 shown in FIG. 5. When the head 15 moves from the lowermost zone X1Y3Z1 to the lowermost zone X1Y3Z0 in the middle zone X1Y3 as indicated by the seek SK2, the managing unit 62 changes the lowermost parameters E17 and F17 corresponding to the lowermost zone X1Y3Z1 into the lowermost parameters E16 and F16 corresponding to the lowermost zone X1Y3Z0 based on, for example, the table TB2 shown in FIG. 5. When the head 15 moves from the lowermost zone X1Y3Z1 to the lowermost zone X1Y0Z0 in the uppermost zone X1 as indicated by the seek SK3, the managing unit 62 changes the middle parameters C8 and D8 corresponding to the middle zone X1Y3 into the parameters C5 and D5 corresponding to the middle zone X1Y0 and changes the lowermost parameters E17 and F17 corresponding to the lowermost zone X1Y3Z1 to the lowermost parameters E10 and F10 corresponding to the lowermost zone X1Y0Z0, based on, for example, the table TB2 shown in FIG. 5. When the head 15 moves from the lowermost zone X1Y3Z1 corresponding to the uppermost zone X1 to the lowermost zone X0Y4Z0 corresponding to the uppermost zone X0 as indicated by the seek SK4, the managing unit 62 changes the uppermost parameters A1 and B1 corresponding to the uppermost zone X1 into the uppermost parameters A0 and B0 corresponding to the uppermost zone X0, changes the middle parameters C8 and D8 corresponding to the middle zone X1Y3 into the middle parameters C4 and D4 corresponding to the middle zone X0Y4, and changes the lowermost parameters E17 and F17 corresponding to the lowermost zone X1Y3Z1 into the lowermost parameters E8 and F8 corresponding to the lowermost zone X0Y4Z0, based on, for example, the table TB2 shown in FIG. 5.

The setting unit 63 sets layers of parameter groups changeable in each zone. For example, when the head 15 moves across the lowermost zone in each zone, the setting unit 63 sets the lowermost parameters, the middle parameters, and the uppermost parameters to be changeable. In other words, when the head 15 moves out of the current lowermost zone in each zone, the setting unit 63 sets the lowermost parameters, the middle parameters, and the uppermost parameters to be changeable. When the head 15 moves across the middle zone in each zone, the setting unit 63 sets the uppermost parameters and the middle parameters to be changeable. In other words, when the head 15 moves out of the current middle zone in each zone, the setting unit 63 sets the uppermost parameters and the middle parameters to be changeable. In addition, when the head 15 moves across the uppermost zone in each zone, the setting unit 63 sets the uppermost parameters to be changeable. In other words, when the head 15 moves out of the current uppermost zone in each zone, the setting unit 63 sets the uppermost parameters to be changeable. Hereinafter, setting allowing the lowermost parameters, the middle parameters, and the uppermost parameters to be changeable when the head 15 moves across the lowermost zone is referred to as the lowermost layer mode, setting allowing the middle parameters and the uppermost parameters to be changeable when the head 15 moves across the middle zone is referred to as the middle mode, and setting allowing the uppermost parameters to be changeable when the head 15 moves across the uppermost zone is referred to as the uppermost mode. When layers of parameter groups changeable in each zone are set, the setting unit 63 sets particular parameter groups (hereinafter, referred to as base parameters) of layers that cannot be changed in each zone. It is preferable that the base parameter is, for example, a parameter (hereinafter, also referred to as an innermost circumferential parameter) corresponding to a radial range (hereinafter, referred to as an innermost circumferential range) positioned at the innermost side in each layer of each zone. When the read/write processing is performed based on a parameter corresponding to a high frequency in each radial range of a particular zone, it is likely that the read/write processing cannot be performed inside each radial range of the particular zone. For this reason, the innermost circumferential parameter is used as the base parameter, such that it is possible to certainly perform the read/write processing based on a parameter corresponding to a low frequency in each radial range of the particular zone. The base parameter may not be, for example, the innermost circumferential parameter. For example, when each parameter group corresponding to each layer is adjusted during a manufacturing process, the setting unit 63 sets layers of parameter groups changeable in each zone.

When a mode is set to the lowermost mode by the setting unit 63, the managing unit 62 changes the uppermost parameters, the middle parameters, and the lowermost parameter based on the table TB2 shown in FIG. 5, when the head 15 moves across the lowermost zone as described with reference to FIG. 7.

FIG. 8 is a schematic view showing an example of a table TB2 showing a relationship between each parameter group changeable when a mode is set to the middle mode and a plurality of radial ranges corresponding to each layer according to the embodiment. In FIG. 8, rightward oblique line portions show changeable radial ranges and parameters.

In the example shown in FIG. 8, when the mode is set to the middle mode, the setting unit 63 sets the lowermost parameters (hereinafter, referred to as the inner lowermost parameters) corresponding to the lowermost zone positioned at the innermost side among a plurality of lowermost zones corresponding to each middle zone to base parameters (hereinafter, referred to as the lowermost base parameters). In one example, when the mode is set to the middle mode, the setting unit 63 sets the inner lowermost parameters E1 and F1 corresponding to the lowermost zone X0Y0Z1 corresponding to the middle zone X0Y0 to the lowermost base parameters. When the mode is set to the middle mode, if the setting unit 63 sets the lowermost parameters corresponding to one of the plurality of lowermost zones corresponding to each middle zone to the lowermost base parameters, the setting unit 63 may not set the inner lowermost parameters to the lowermost base parameters.

Figure 9:
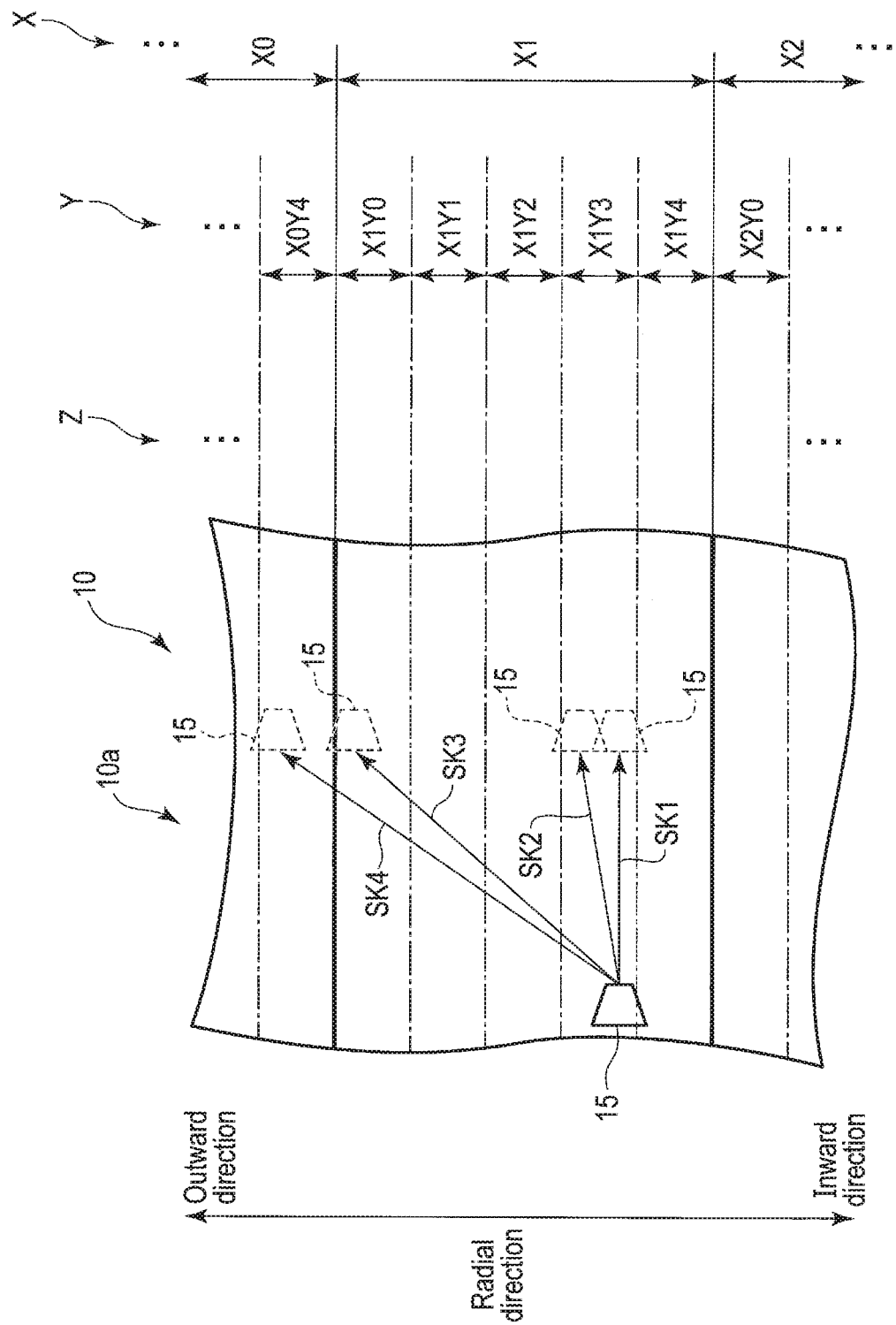
FIG. 9 is a schematic view showing an example of a method of changing each parameter of each layer depending on a radial position of the head when a mode is set to the middle mode according to the embodiment.

FIG. 9 is a schematic view showing an example of a method of changing each parameter of each layer depending on a radial position of the head 15 when a mode is set to the middle mode according to the embodiment. In FIG. 9, as shown in FIG. 8, the setting unit 63 sets the mode to the middle mode.

In the example shown in FIG. 9, when the head 15 is tracking the middle zone X1Y3 as indicated by seek SK1, the head 15 does not move from the middle zone X1Y3, and the managing unit 62 does not thus change the uppermost parameters A1 and B1 deployed in the deployment area SA2 and corresponding to the uppermost zone X1, the middle parameters C8 and D8 deployed in the deployment area SA2 and corresponding to the middle zone X1Y3, and the lowermost base parameters E17 and F17 based on, for example, the table TB2 shown in FIG. 8. When the head 15 moves within the middle zone X1Y3 as indicated by seek SK2, the head 15 does not move from the middle zone X1Y3, and the managing unit 62 does not thus change the uppermost parameters A1 and B1 deployed in the deployment area SA2 and corresponding to the uppermost zone X1, the middle parameters C8 and D8 deployed in the deployment area SA2 and corresponding to the middle zone X1Y3, and the lowermost base parameters E17 and F17 based on, for example, the table TB2 shown in FIG. 8. When the head 15 moves from the middle zone X1Y3 to the middle zone X1Y0 as indicated by seek SK3, the managing unit 62 changes the middle parameters C8 and D8 corresponding to the middle zone X1Y3 into the middle parameters C5 and D5 corresponding to the middle zone X1Y0, and changes the lowermost base parameters E17 and F17 to the lowermost base parameters E11 and F11, based on, for example, the table TB2 shown in FIG. 8. When the head 15 moves from the middle zone X1Y3 corresponding to the uppermost zone X1 to the middle zone X0Y4 corresponding to the uppermost zone X0 as indicated by seek SK4, the managing unit 62 changes the uppermost parameters A1 and B1 corresponding to the uppermost zone X1 into the uppermost parameters A0 and B0 corresponding to the uppermost zone X0, changes the middle parameters C8 and D8 corresponding to the middle zone X1Y3 into the middle parameters C4 and D4 corresponding to the middle zone X0Y4, and changes the lowermost base parameters E17 and F17 into the lowermost base parameters E9 and F9, based on, for example, the table TB2 shown in FIG. 8.

FIG. 10 is a schematic view showing an example of a table TB2 showing a relationship between each parameter group changeable when a mode is set to the uppermost mode and each layer according to the embodiment. In FIG. 10, rightward oblique line portions show changeable zones and parameters.

In the example shown in FIG. 10, when the mode is set to the uppermost mode, the setting unit 63 sets the middle parameters (hereinafter, referred to as the inner middle parameters) corresponding to the middle zone positioned at the innermost side among a plurality of middle zones corresponding to each uppermost zone to base parameters (hereinafter, referred to as the middle base parameters), and sets the inner lowermost parameters of a plurality of lowermost zones corresponding to each middle zone to the lowermost base parameters. In one example, when the mode is set to the uppermost mode, the setting unit 63 sets the inner middle parameters C4 and D4 corresponding to the middle zone X0Y4 corresponding to the uppermost zone X0 to the middle base parameters, and sets the inner lowermost parameters E1 and F1 corresponding to the lowermost zone X0Y4Z1 corresponding to the middle zone X0Y4 to the lowermost base parameters. When the mode is set to the uppermost mode, if the setting unit 63 sets the middle parameters corresponding to one of the plurality of middle zones corresponding to each uppermost zone to the middle base parameters, the setting unit 63 may not set the inner middle parameters to the middle base parameters. In addition, when the mode is set to the uppermost mode, if the setting unit 63 sets the lowermost parameters corresponding to one of the plurality of lowermost zones corresponding to each middle zone to the lowermost base parameters, the setting unit 63 may not set the inner lowermost parameters to the lowermost base parameters.

FIG. 11 is a schematic view showing an example of a method of changing each parameter of each layer depending on a radial position of the head 15 when a mode is set to the uppermost mode according to the embodiment. In FIG. 11, as shown in FIG. 10, the setting unit 63 sets the mode to the uppermost mode.

In the example shown in FIG. 11, when the head 15 is tracking the uppermost zone X1 as indicated by seek SK1, the head 15 does not move from the uppermost zone X1, and the managing unit 62 does not thus change the uppermost parameters A1 and B1 deployed in the deployment area SA2 and corresponding to the uppermost zone X1, the middle base parameters C9 and D9, and the lowermost base parameters E19 and F19 based on, for example, the table TB2 shown in FIG. 10. When the head 15 moves within the uppermost zone X1 as indicated by seek SK2, the head 15 does not move from the uppermost zone X1, and the managing unit 62 does not thus change the uppermost parameters A1 and B1 deployed in the deployment area SA2 and corresponding to the uppermost zone X1, the middle base parameters C9 and D9, and the lowermost base parameters E19 and F19 based on, for example, the table TB2 shown in FIG. 10. When the head 15 moves within the uppermost zone X1 as indicated by seek SK3, the head 15 does not move from the uppermost zone X1, and the managing unit 62 does not thus change the uppermost parameters A1 and B1 deployed in the deployment area SA2 and corresponding to the uppermost zone X1, the middle base parameters C9 and D9, and the lowermost base parameters E19 and F19 based on, for example, the table TB2 shown in FIG. 10. When the head 15 moves from the uppermost zone X1 to the uppermost zone X0 as indicated by seek SK4, the managing unit 62 changes the uppermost parameters A1 and B1 corresponding to the uppermost zone X1 into the uppermost parameters A0 and B0 corresponding to the uppermost zone X0, changes the middle base parameters C9 and D9 into the middle base parameters C4 and D4, and changes the lowermost base parameters E19 and F19 into the lowermost base parameters E9 and F9, based on, for example, the table TB2 shown in FIG. 10.

Figure 12:
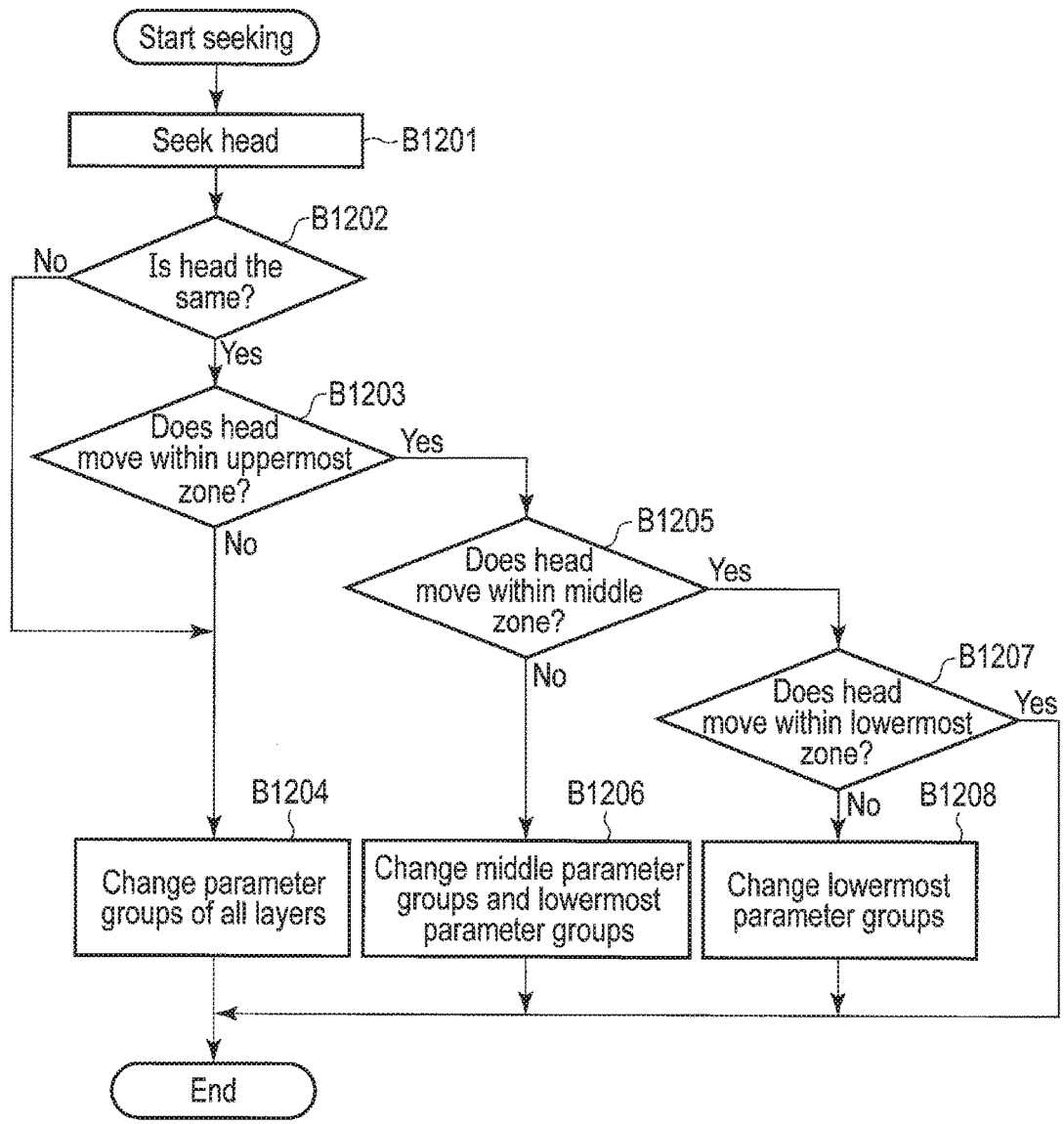
FIG. 12 is a flowchart showing an example of a method of controlling the head according to the embodiment.

FIG. 12 is a flowchart showing an example of a method of controlling the head 15 according to the embodiment.

The MPU 60 seeks the head 15 at a particular radial position (B1201), and determines whether or not the sought head 15 is the same (B1202). When the MPU 60 determines that the head 15 is the same (YES in B1202), the MPU 60 determines whether the head 15 moves within the current uppermost zone or moves out of the current uppermost zone (B1203). When it is determined that the head 15 moves out of the current uppermost zone (NO in B1203), the MPU 60 changes each parameter group of all the layers (B1204), and ends a process. When it is determined that the head 15 moves within the current uppermost zone (YES in B1203), the MPU 60 determines whether or not the head 15 moves within the current middle zone or moves out of the current middle zone (B1205). When it is determined that the head 15 moves out of the current middle zone (NO in B1205), the MPU 60 changes the middle parameter groups and the lowermost parameter groups (B1206), and ends a process. When it is determined that the head 15 moves within the current middle zone (YES in B1205), the MPU 60 determines whether or not the head 15 moves within the current lowermost zone or moves out of the current lowermost zone (B1207). When it is determined that the head 15 moves out of the current lowermost zone (NO in B1207), the MPU 60 changes the lowermost parameter groups (B1208), and ends a process. When it is determined that the head 15 moves within the current lowermost zone (YES in B1207), the MPU 60 ends a process.

FIG. 13 is a flowchart showing an example of a method of adjusting each parameter of each layer according to the embodiment.

The MPU 60 sets a mode to the uppermost mode (B1301), adjusts each uppermost parameter group (B1302), sets a mode to the middle mode (B1303), adjusts each middle parameter group (B1304), sets a mode to the lowermost mode (B1305), and adjusts each lowermost parameter group (B1306).

According to the present embodiment, the magnetic disk device 1 manages a plurality of parameters related to the read/write processing corresponding to each zone in a plurality of layers. The magnetic disk device 1 can efficiently write the data to the disk 10 by dividing the parameters indicating the divisions of the zones, the recording frequencies, or the like, per small radial range. Since the magnetic disk device 1 can divide only parameters that need to be set per small radial range among the plurality of parameters in each zone, it is possible to suppress an increase in a capacity due to the division of the parameters. Since the magnetic disk device 1 can change the parameter group per layer, performance related to the setting of the read processing and the write processing can be improved. Since the magnetic disk device 1 can adjust the parameter group per layer in a manufacturing process, a test time can be shortened and adjustment accuracy can be improved.

While a certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk;
a head configured to write data to the disk and read data from the disk; and
a controller configured to control the head based on a plurality of upper parameter groups each corresponding to a plurality of upper areas among a plurality of parameter groups each corresponding to a plurality of recording areas into which the disk is divided in a radial direction, the upper areas each corresponding to the recording areas, and a plurality of lower parameter groups each corresponding to a plurality of lower areas into which the upper areas are each divided in the radial direction, the lower parameter groups being different from the upper parameter groups among the parameter groups.

2. The magnetic disk device according to claim 1, wherein the controller controls the head based on a first upper parameter group of the upper parameter groups corresponding to a first upper area and a first lower parameter group of the lower parameter groups corresponding to a first lower area, in the first lower area of the lower areas corresponding to the first upper area of the upper areas.

3. The magnetic disk device according to claim 2, wherein when the head moves from the first lower area to a second lower area of the lower areas corresponding to the first upper area, the controller changes the first lower parameter group into a second lower parameter group of the lower parameter groups corresponding to the second lower area.

4. The magnetic disk device according to claim 3, wherein the controller controls the head based on the first upper parameter group and the second lower parameter group in the second lower area.

5. The magnetic disk device according to claim 2, wherein when the head moves from the first lower area to a second lower area of the lower areas corresponding to a second upper area of the upper areas, the controller changes the first upper parameter group into a second upper parameter group of the upper parameter groups corresponding to the second upper area.

6. The magnetic disk device according to claim 5, wherein the controller controls the head based on the second upper parameter group and the first lower parameter group in the second upper area.

7. The magnetic disk device according to claim 5, wherein the controller changes the first lower parameter group into a second lower parameter group of the lower parameter groups corresponding to the second lower area.

8. The magnetic disk device according to claim 7, wherein the controller controls the head based on the second upper parameter group and the second lower parameter group.

9. The magnetic disk device according to claim 2, wherein the controller adjusts the first upper parameter group without changing the first lower parameter group in the first upper area.

10. The magnetic disk device according to claim 1, wherein the upper parameter groups and the lower parameter groups are used to set current values related to write processing and read processing of the head.

11. A method of controlling a magnetic disk device comprising a disk and a head configured to write data to the disk and read data from the disk, the method comprising:
controlling the head based on a plurality of upper parameter groups each corresponding to a plurality of upper areas among a plurality of parameter groups each corresponding to a plurality of recording areas into which the disk is divided in a radial direction, the upper areas each corresponding to the recording areas, and a plurality of lower parameter groups each corresponding to a plurality of lower areas into which the upper areas are each divided in the radial direction, the lower parameter groups being different from the upper parameter groups among the parameter groups.

12. The method of controlling a magnetic disk device according to claim 11, further comprising:
controlling the head based on a first upper parameter group of the upper parameter groups corresponding to a first upper area and a first lower parameter group of the lower parameter groups corresponding to a first lower area, in the first lower area of the lower areas corresponding to the first upper area of the upper areas.

13. The method of controlling a magnetic disk device according to claim 12, further comprising:
when the head moves from the first lower area to a second lower area of the lower areas corresponding to the first upper area, changing the first lower parameter group into a second lower parameter group of the lower parameter groups corresponding to the second lower area.

14. The method of controlling a magnetic disk device according to claim 13, further comprising:
controlling the head based on the first upper parameter group and the second lower parameter group in the second lower area.

15. The method of controlling a magnetic disk device according to claim 12, further comprising:
when the head moves from the first lower area to a second lower area of the lower areas corresponding to a second upper area of the upper areas, changing the first upper parameter group into a second upper parameter group of the upper parameter groups corresponding to the second upper area.

16. The method of controlling a magnetic disk device according to claim 15, further comprising:

controlling the head based on the second upper parameter group and the first lower parameter group in the second upper area.

17. The method of controlling a magnetic disk device according to claim 15, further comprising:
changing the first lower parameter group into a second lower parameter group of the lower parameter groups corresponding to the second lower area.

18. The method of controlling a magnetic disk device according to claim 17, further comprising:
controlling the head based on the second upper parameter group and the second lower parameter group.

19. The method of controlling a magnetic disk device according to claim 12, further comprising:
adjusting the first upper parameter group without changing the first lower parameter group in the first upper area.

20. The method of controlling a magnetic disk device according to claim 11, wherein the upper parameter groups and the lower parameter groups are used to set current values related to write processing and read processing of the head.

* * * * *